July 22, 1930.  H. J. PATTISON  1,771,309
RUBBER BUMPER HOUSING
Filed Nov. 5, 1926  2 Sheets-Sheet 1
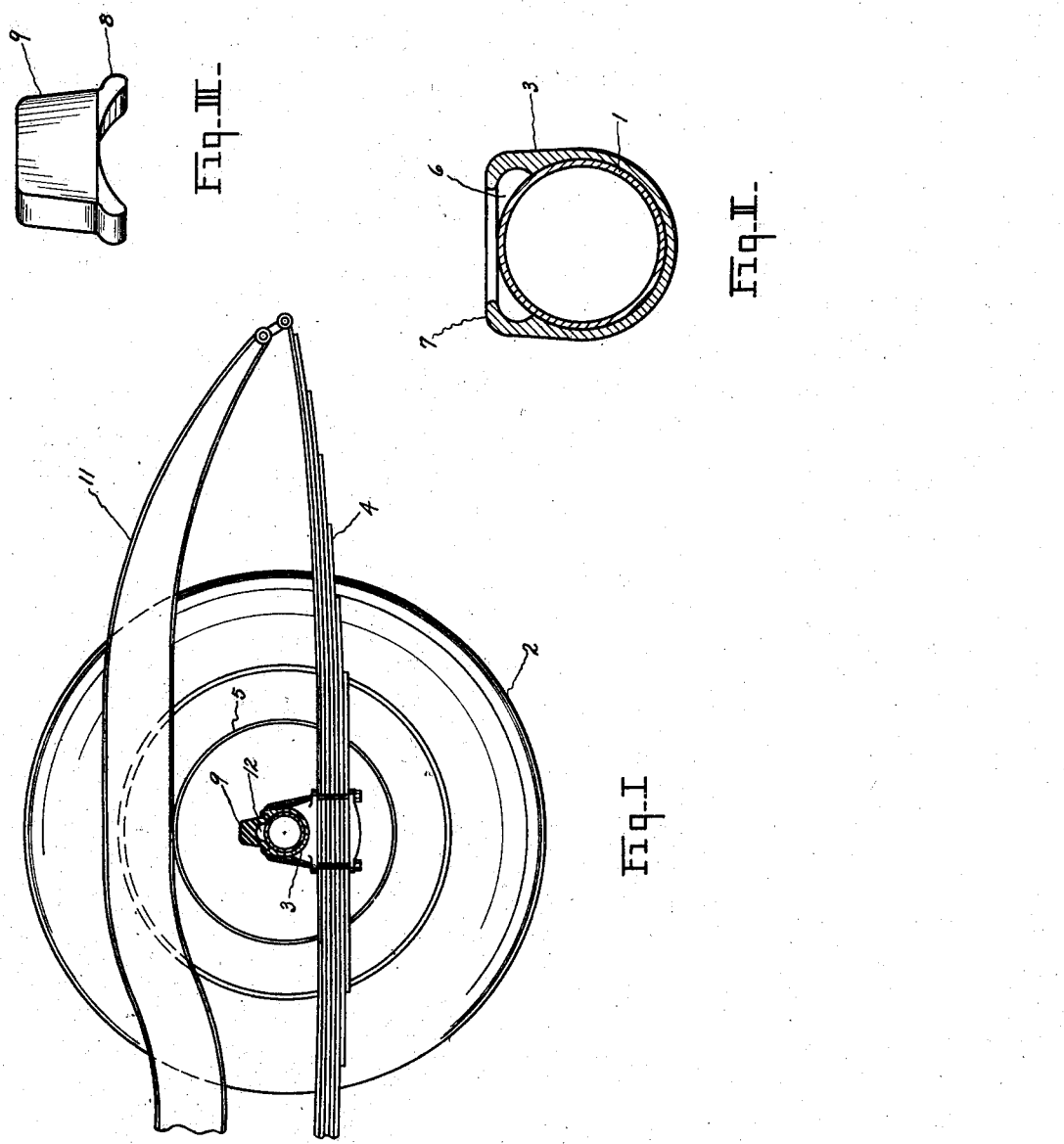
INVENTOR.
HERBERT J. PATTISON
BY Solon J. Boughton
ATTORNEY.

July 22, 1930.                H. J. PATTISON                1,771,309
                           RUBBER BUMPER HOUSING
                             Filed Nov. 5, 1926          2 Sheets-Sheet 2
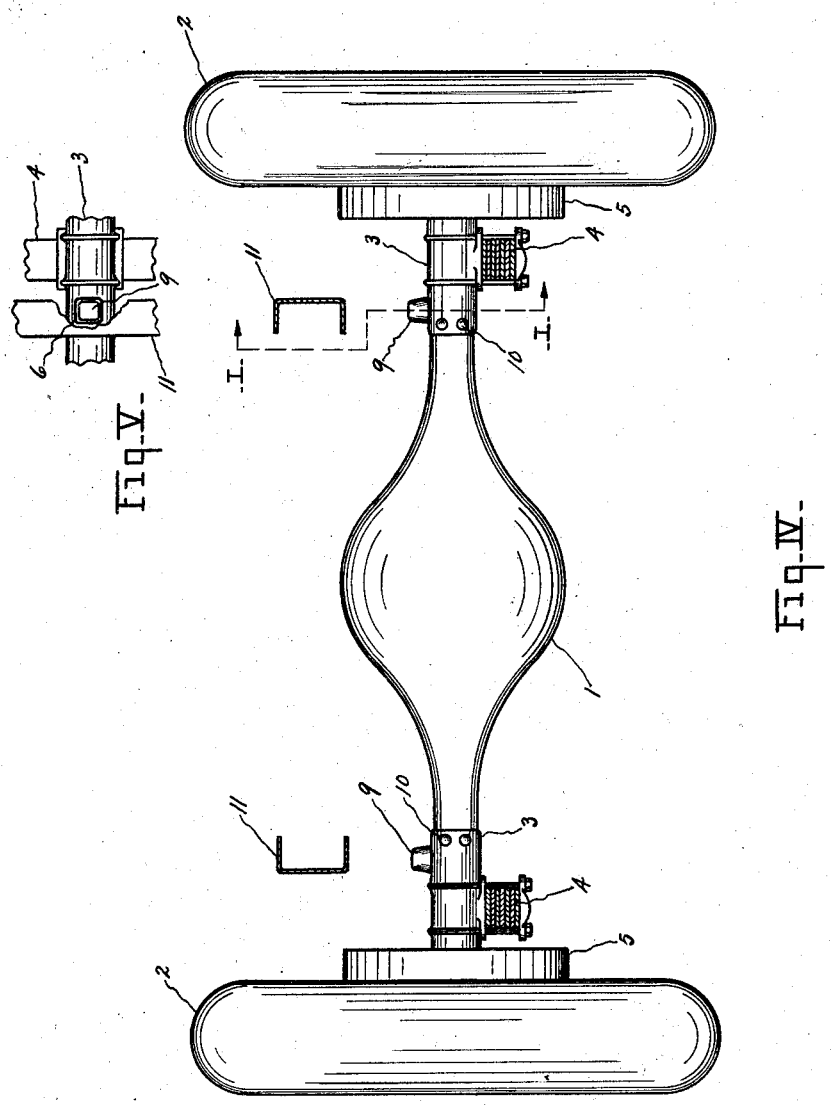
INVENTOR.
HERBERT J. PATTISON
BY Solon J. Boughten
ATTORNEY Patented July 22, 1930

1,771,309

UNITED STATES PATENT OFFICE

HERBERT J. PATTISON, OF CLEVELAND, OHIO, ASSIGNOR TO THE WILLYS-OVERLAND COMPANY, OF TOLEDO, OHIO, A CORPORATION OF OHIO

RUBBER-BUMPER HOUSING

Application filed November 5, 1926. Serial No. 146,337.

This invention relates to axles for motor vehicles, and more particularly to composite axles having cast brake supports secured to a central housing.

One of the objects of the invention is to provide an axle for a motor vehicle having cast brake supports to which resilient bumpers may be cheaply and quickly fitted.

Another object of the invention is to provide a brake support for a motor vehicle axle in which the bumper sockets are formed integral with the support.

Another object of the invention is to provide a brake support for an axle in which the bumper sockets are integral and adapted to retain resilient bumpers therein without the use of separate securing means.

Other objects will appear from the description to follow, in conjunction with which for the purposes of the present application, I have illustrated one embodiment of the invention in the accompanying drawings, in which:

Figure I is a sectional side elevation of a portion of a motor vehicle taken on line I—I of Fig. IV, showing a resilient bumper mounted in my improved brake support.

Fig. II is an enlarged sectional view of the socket portion of the support showing the housing end that forms the bottom of the socket. Fig. III is a perspective view of the resilient bumper.

Fig. IV is a rear elevation partly in section of a motor vehicle rear axle, showing the location of the bumpers with relation to the vehicle frame.

Fig. V is a top plan view of a portion of the brake support with the frame broken away to show the bumper and socket.

The use of resilient bumpers is known to be old in the art but the novel means of securing the bumper to the axle, as set forth in the description to follow, is new and materially reduces the labor and cost heretofore involved in installing bumpers.

Referring to the drawings, in which like characters refer to like parts throughout the views, 1 is a central housing of a composite rear axle within which are enclosed the usual parts for driving wheels 2 of the vehicle. At each end of housing 1 is secured a brake support 3 which is preferably a casting in order to provide sufficient rigidity for securing the vehicle springs 4 and provide support for the braking mechanism enclosed in brake drum 5. Brake support 3 is cast with an integral socket portion having inturned flanges 7 which are adapted to overlap and grip the outwardly projecting feet 8 of the resilient bumper 9. The inner portions of supports 3 are preferably formed of the same shape as the end portions of housing 1 so that the supports may be pressed thereon and secured thereto by any suitable means such as rivets 10.

The end portions of housing 1 preferably extend into each of the supports 3 a sufficient distance to provide a bottom for the socket portion 6 that preferably opens into the body of the cast support 3, but if desired the bottom may be cast integral with the support. Sockets 6 are so located on the housing that when the axle is assembled to the vehicle, they will open upward and be immediately below the superimposed frame 11 as shown in Fig. IV.

The resilient bumper 9, which may be made of rubber or other suitable material, is provided with laterally extending feet 8 that engage under the flanges 7 of the socket 6. Bumper 9 is preferably somewhat wider than the internal diameter of the socket so that when compressed and inserted it will expand and tightly engage the sides of the socket 6. The base of the bumper may be concave in form as shown in Fig. III, and although this form is not essential, the concave base will permit the bumper to be more easily compressed, and will also increase the resiliency, because of the air space 12 formed between the bumper and the bottom of its socket.

It may be easily seen from the foregoing description that I have provided a means for securing a resilient bumper to a motor vehicle axle that may be cast integral with the brake support with practically no additional cost, and which will require no additional securing means for the bumper.

While I have illustrated and described somewhat in detail one embodiment of the invention, it is to be understood that this showing and description are illustrative only, and that I do not regard the invention as limited to the details of construction illustrated and described, except in so far as I have included such limitations within the terms of the following claims, in which it is my intention to claim all novelty inherent in the invention broadly as well as specifically.

I claim as my invention:

1. The combination with an axle housing for a motor vehicle having a frame above said housing, of a vehicle brake support secured to said housing having an opening therein, a resilient bumper in said opening and a portion of said housing extending into said support beneath said bumper and forming a support therefor.

2. A composite axle for a motor vehicle comprising a central housing, a pair of brake supports secured to said housing at the ends thereof, said brake supports having integral sockets formed therein, said housing having its ends projecting into said supports beneath said sockets, resilient bumpers rested on the housing having extended feet within said sockets and integral inturned flanges on said sockets for securing the feet of said bumpers and retaining them within said sockets.

3. A composite axle for a motor vehicle comprising a central housing, a brake support secured to said housing at the end thereof, said brake support having an integral socket with a constricted mouth formed therein, said housing having a portion thereof projecting within the support beneath the socket, and a resilient bumper within said socket and rested on the housing.

In testimony whereof I affix my signature.

HERBERT J. PATTISON.